United States Patent
Kim et al.

(10) Patent No.: US 7,933,347 B2
(45) Date of Patent: Apr. 26, 2011

(54) RECEIVER AND METHOD FOR COMPENSATING FOR FREQUENCY OFFSET OF RECEIVING SIGNAL IN MULTI-BAND OFDM SCHEME

(75) Inventors: Yun Young Kim, Yongin-si (KR); Jae Ho Roh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1063 days.

(21) Appl. No.: 11/705,162

(22) Filed: Feb. 12, 2007

(65) Prior Publication Data

US 2008/0095250 A1 Apr. 24, 2008

(30) Foreign Application Priority Data

Oct. 18, 2006 (KR) .................. 10-2006-0101445

(51) Int. Cl.
*H04K 1/10* (2006.01)
(52) U.S. Cl. ........................ 375/260; 375/259
(58) Field of Classification Search .............. 375/260, 375/259; 370/69.1; 455/59; 714/786, 794, 714/795
See application file for complete search history.

(56) References Cited

U.S. PATENT DOCUMENTS

| | | | | |
|---|---|---|---|---|
| 5,852,630 A * | 12/1998 | Langberg et al. | ............. | 375/219 |
| 6,381,265 B1 * | 4/2002 | Hessel et al. | ................. | 375/219 |
| 7,177,374 B2 * | 2/2007 | Gaikwad et al. | ............. | 375/331 |
| 7,366,087 B2 * | 4/2008 | Lee et al. | ....................... | 370/203 |
| 2004/0109508 A1 * | 6/2004 | Jeon et al. | ...................... | 375/260 |
| 2004/0131012 A1 * | 7/2004 | Mody et al. | .................. | 370/210 |
| 2004/0228270 A1 | 11/2004 | Chen et al. | | |
| 2004/0252776 A1 | 12/2004 | Balakrishnan et al. | | |
| 2006/0083290 A1 | 4/2006 | Shin et al. | | |
| 2007/0110171 A1 * | 5/2007 | Iida | .............. | 375/260 |
| 2007/0133662 A1 * | 6/2007 | Kang et al. | .................... | 375/148 |
| 2007/0268976 A1 * | 11/2007 | Brink et al. | ................... | 375/260 |

FOREIGN PATENT DOCUMENTS

| | | |
|---|---|---|
| EP | 0 730 357 A3 | 9/1996 |
| EP | 1 195 961 A3 | 4/2002 |
| KR | 10-2002-066023 A | 8/2002 |
| KR | 10-2006-034578 A | 4/2006 |

* cited by examiner

*Primary Examiner* — Shuwang Liu
*Assistant Examiner* — Helene Tayong
(74) *Attorney, Agent, or Firm* — Sughrue Mion, PLLC

(57) ABSTRACT

A multiband Orthogonal Frequency Division Multiplexing (OFDM) receiver, and more particularly, a receiver and method for effectively compensating for a frequency offset of a received signal in a multiband OFDM scheme. The receiver for compensating for a frequency offset of a received signal in an OFDM scheme includes: a numerically controlled oscillator (NCO) which generates a first compensation signal by processing an input signal in a time domain based on a first carrier frequency offset estimated in the time domain, and a second carrier frequency offset estimated in a frequency domain; a sampling frequency offset tracking (SFOT) unit which generates a second compensation signal by estimating a sampling frequency offset from frequency domain pilot symbols contained in the first compensation signal; and a carrier frequency offset tracking (CFOT) unit which estimates the second carrier frequency offset by using pilot symbols contained in the second compensation signal.

21 Claims, 9 Drawing Sheets

FIG. 5

| SYMBOL COUNT | 41-CLOCK 0 | | | 41-CLOCK 1 | | | 41-CLOCK 2 | | | 42-CLOCK 3 | | | 41-CLOCK 0 | | |
|---|---|---|---|---|---|---|---|---|---|---|---|---|---|---|---|
| CLOCK COUNT INPUT | 0 1 2 3 … 39 40 | | | 0 1 2 3 … 39 40 | | | 0 1 2 3 … 39 40 | | | 0 1 2 3 … 40 41 | | | 0 1 2 3 … 39 40 | | |
| | 0 4 8 12 … 156 160 | | | 0 4 8 12 … 155 159 | | | 163 2 6 10 … 154 158 | | | 162 1 5 9 … 157 161 | | | 0 4 8 12 … 156 160 | | |
| | 1 5 9 13 … 157 161 | | | 0 4 8 12 … 156 160 | | | 164 3 7 11 … 155 159 | | | 163 2 6 10 … 158 162 | | | 1 5 9 13 … 157 161 | | |
| | 2 6 10 14 … 158 162 | | | 1 5 9 13 … 157 161 | | | 0 4 8 12 … 156 160 | | | 164 3 7 11 … 159 163 | | | 2 6 10 14 … 158 162 | | |
| | 3 7 11 15 … 159 163 | | | 2 6 10 14 … 158 162 | | | 1 5 9 13 … 157 161 | | | 0 4 8 12 … 160 160 | | | 3 7 11 15 … 159 163 | | |
| <POSITION=0> OUTPUT | 0 1 2 3 … 39 40 | | | 0 1 2 3 … 39 40 | | | 0 1 2 3 … 39 40 | | | 0 1 2 3 … 40 41 | | | 0 1 2 3 … 39 40 | | |
| | 0 4 8 12 … 156 160 | | | 0 4 8 12 … 156 160 | | | 0 4 8 12 … 156 160 | | | 0 4 8 12 … 160 160 | | | 0 4 8 12 … 156 160 | | |
| | 1 5 9 13 … 157 161 | | | 1 5 9 13 … 157 161 | | | 1 5 9 13 … 157 161 | | | 1 5 9 13 … 161 0 | | | 1 5 9 13 … 157 161 | | |
| | 2 6 10 14 … 158 162 | | | 2 6 10 14 … 158 162 | | | 2 6 10 14 … 158 162 | | | 2 6 10 14 … 162 1 | | | 2 6 10 14 … 158 162 | | |
| | 3 7 11 15 … 159 163 | | | 3 7 11 15 … 159 163 | | | 3 7 11 15 … 159 163 | | | 3 7 11 15 … 163 2 | | | 3 7 11 15 … 159 163 | | |
| <POSITION=1> OUTPUT | 0 1 2 3 … 39 40 | | | 0 1 2 3 … 39 40 | | | 0 1 2 3 … 39 40 | | | 0 1 2 3 … 40 41 | | | 0 1 2 3 … 39 40 | | |
| | 1 5 9 13 … 157 161 | | | 1 5 9 13 … 157 161 | | | 1 5 9 13 … 157 161 | | | 1 5 9 13 … 161 0 | | | 1 5 9 13 … 157 161 | | |
| | 2 6 10 14 … 158 162 | | | 2 6 10 14 … 158 162 | | | 2 6 10 14 … 158 162 | | | 2 6 10 14 … 162 1 | | | 2 6 10 14 … 158 162 | | |
| | 3 7 11 15 … 159 163 | | | 3 7 11 15 … 159 163 | | | 3 7 11 15 … 159 163 | | | 3 7 11 15 … 163 2 | | | 3 7 11 15 … 159 163 | | |
| | 4 8 12 16 … 160 164 | | | 4 8 12 16 … 160 164 | | | 4 8 12 16 … 160 164 | | | 4 8 12 16 … 164 3 | | | 4 8 12 16 … 160 164 | | |
| <POSITION=2> OUTPUT | 0 1 2 3 … 39 40 | | | 0 1 2 3 … 39 40 | | | 0 1 2 3 … 39 40 | | | 0 1 2 3 … 40 41 | | | 0 1 2 3 … 39 40 | | |
| | 2 6 10 14 … 158 162 | | | 2 6 10 14 … 158 162 | | | 2 6 10 14 … 158 162 | | | 2 6 10 14 … 162 1 | | | 2 6 10 14 … 158 162 | | |
| | 3 7 11 15 … 159 163 | | | 3 7 11 15 … 159 163 | | | 3 7 11 15 … 159 163 | | | 3 7 11 15 … 163 2 | | | 3 7 11 15 … 159 163 | | |
| | 4 8 12 16 … 160 164 | | | 4 8 12 16 … 160 164 | | | 4 8 12 16 … 160 164 | | | 4 8 12 16 … 164 3 | | | 4 8 12 16 … 160 164 | | |
| | 5 9 13 17 … 161 0 | | | 5 9 13 17 … 161 0 | | | 5 9 13 17 … 161 0 | | | 5 9 13 17 … 0 4 | | | 5 9 13 17 … 161 0 | | |
| <POSITION=3> OUTPUT | 0 1 2 3 … 39 40 | | | 0 1 2 3 … 39 40 | | | 0 1 2 3 … 39 40 | | | 0 1 2 3 … 40 41 | | | 0 1 2 3 … 39 40 | | |
| | 3 7 11 15 … 159 163 | | | 3 7 11 15 … 159 163 | | | 3 7 11 15 … 159 163 | | | 3 7 11 15 … 163 2 | | | 3 7 11 15 … 159 163 | | |
| | 4 8 12 16 … 160 164 | | | 4 8 12 16 … 160 164 | | | 4 8 12 16 … 160 164 | | | 4 8 12 16 … 164 3 | | | 4 8 12 16 … 160 164 | | |
| | 5 9 13 17 … 161 0 | | | 5 9 13 17 … 161 0 | | | 5 9 13 17 … 161 0 | | | 5 9 13 17 … 0 4 | | | 5 9 13 17 … 161 0 | | |
| | 6 10 14 18 … 162 1 | | | 6 10 14 18 … 162 1 | | | 6 10 14 18 … 162 1 | | | 6 10 14 18 … 1 5 | | | 6 10 14 18 … 162 1 | | |

RECEIVER AND METHOD FOR COMPENSATING FOR FREQUENCY OFFSET OF RECEIVING SIGNAL IN MULTI-BAND OFDM SCHEME

CROSS-REFERENCE TO RELATED APPLICATIONS

This application claims priority from Korean Patent Application No. 10-2006-0101445, filed on Oct. 18, 2006, in the Korean Intellectual Property Office, the entire disclosure of which is incorporated herein by reference.

BACKGROUND OF THE INVENTION

1. Field of the Invention

Methods and apparatuses consistent with the present invention relate to a multiband Orthogonal Frequency Division Multiplexing (OFDM) receiver, and more particularly, to effectively compensating for a frequency offset of a received signal in a multiband OFDM scheme.

2. Description of Related Art

A multiband OFDM scheme generally indicates a method of transmitting a signal while hopping in a plurality of frequency bands per OFDM symbol unit, and particularly, indicates a modulation technology which is used for a particular wireless communication system such as an Ultra Wideband (UWB) system. In this instance, the multiband OFDM system may transmit and receive a large number of data per time unit by transmitting data using a plurality of frequency bands with a regular frequency band.

In most wireless communication systems, a frequency offset occurs when a frequency of an oscillator of a transmitting end does not precisely match a frequency of an oscillator of a receiving end. Specifically, when the frequency offset exists, the receiving end may not detect a signal precisely and thus, a multiband OFDM receiver which precisely detects a received signal is required.

As an example, a multiband OFDM receiver according to a related art estimates a frequency offset in a frequency domain using a pilot symbol, and compensates for the estimated frequency offset. Also, the multiband OFDM receiver estimates a remaining frequency offset and then compensates for the estimated remaining frequency offset in the frequency domain with a decision-directed method using a modulated pilot symbol. Also, the multiband OFDM receiver according to the related art estimates a frequency offset using a pilot symbol in a frequency band and then compensates for the estimated frequency offset in a time domain. Also, the multiband OFDM receiver estimates a remaining frequency offset and compensates for the estimated remaining frequency error in the frequency domain.

However, the multiband OFDM receiver according to the related art may not track a quick phase change which is caused by a large frequency offset. Therefore, as a frequency offset increases, a performance of the multiband OFDM receiver significantly deteriorates. To overcome the above-described disadvantages, a multiband OFDM receiver which can effectively compensate for a frequency offset of a received signal in a multiband OFDM receiver is required.

SUMMARY OF THE INVENTION

The present invention provides a receiver and method for compensating for a frequency offset of a received signal in a multiband OFDM scheme, which can compensate for a carrier frequency offset in a time domain and also compensate for a sampling frequency offset in a frequency domain and then estimate a remaining carrier frequency offset, to effectively compensate for a frequency offset of a received signal in a multiband OFDM receiver.

According to an aspect of the present invention, there is provided a receiver for compensating for a frequency offset of a received signal in a multiband OFDM scheme, the receiver including: a numerically controlled oscillator (NCO) which generates a first compensation signal by processing an input signal in a time domain based on a first carrier frequency offset estimated in the time domain, and a second carrier frequency offset estimated in a frequency domain; a sampling frequency offset tracking (SFOT) unit which generates a second compensation signal by estimating a sampling frequency offset from frequency domain pilot symbols which are contained in the first compensation signal; and a carrier frequency offset tracking (CFOT) unit which estimates the second carrier frequency offset by using pilot symbols which are contained in the second compensation signal.

According to another aspect of the present invention, there is provided a method of compensating for a frequency offset of a received signal in a multiband OFDM scheme, the method including: generating a first compensation signal by processing an input signal in a time domain; generating a second compensation signal by estimating a sampling frequency offset from frequency domain pilot symbols which are contained in the first compensation signal; and estimating the second carrier frequency offset by using pilot symbols which are contained in the second compensation signal, wherein the generating of the first compensation signal comprises: processing the input signal based on a first carrier frequency offset estimated in the time domain and the second carrier frequency offset estimated in a frequency domain.

BRIEF DESCRIPTION OF THE DRAWINGS

The above and other aspects of the present invention will become apparent and more readily appreciated in the following detailed description of certain exemplary embodiments of the invention, taken in conjunction with the accompanying drawings, in which:

FIG. 5 is a diagram illustrating an example of an input/output value of a switch using a position value according to an exemplary embodiment of the present invention;

DETAILED DESCRIPTION OF EXEMPLARY EMBODIMENTS

Figure 1:
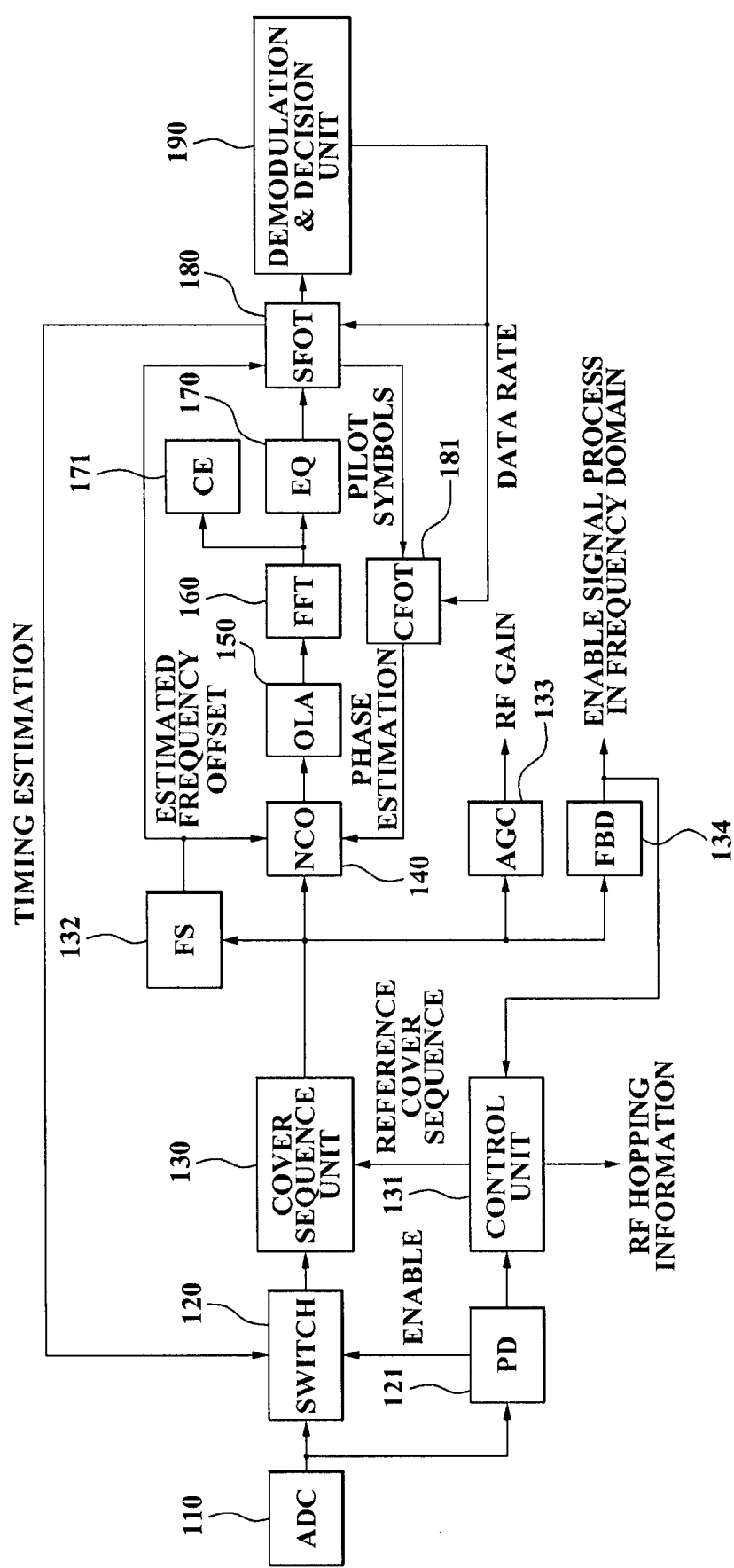
FIG. 1 is a configuration diagram illustrating a receiver for compensating for a frequency offset of a received signal in a multiband OFDM scheme according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a configuration diagram illustrating a receiver for compensating for a frequency offset of a received signal in a multiband OFDM scheme according to an exemplary embodiment of the present invention.

As shown in FIG. 1, the receiver, which compensates for the frequency offset of the received signal in the multiband OFDM scheme, includes an analog-to-digital converter (ADC) 110, a switch 120, a cover sequence unit 130, a numerically controlled oscillator (NCO) 140, an overlap and add (OLA) unit 150, a fast Fourier transform (FFT) unit 160, an equalization (EQ) unit 170, a sampling frequency offset tracking (SFOT) unit 180, a demodulation and decision unit 190, a packet detection (PD) unit 121, a control unit 131, a frequency synchronization (FS) unit 132, an automatic gain control (AGC) unit 133, a frame boundary detection (FBD) unit 134, a channel estimation (CE) unit 171, and a carrier frequency offset tracking (CFOT) unit 181.

The ADC 110 receives a radio frequency (RF) signal of an OFDM scheme, samples the received RF signal, and converts the sampled RF signal into a digital signal. In this instance, the ADC 110 samples the received RF signal with a frequency greater than 528 MHz. The switch 120 converts the digital signal from serial form into parallel form according to a position value.

The cover sequence unit 130 unmasks a preamble from the digital signal, which is switched into the parallel form, according to a Time Frequency Code (TFC). The NCO 140 generates a first compensation signal by processing an input signal from the cover sequence unit 130 based on a first carrier frequency offset estimated in a time domain and a second carrier frequency offset estimated in a frequency domain.

The OLA unit 150 overlaps and adds a predetermined sample to a header of each OFDM symbol, and the FFT unit 160 fast Fourier transforms signals output from the NCO 140 into the frequency domain. Here, the predetermined sample is acquired when the first compensation signal output from the NCO 140 is delayed and spread.

The EQ unit 170 compensates for each signal output from the FFT unit 160 based on the estimated signal distortion. The SFOT unit 180 generates a second compensation signal by estimating a sampling frequency offset from frequency domain pilot symbols which are contained in the signal output from the EQ unit 170.

The CFOT unit 181 estimates the second carrier frequency offset by using pilot symbols which are contained in the second compensation signal. The demodulation and decision unit 190 demodulates the second compensation signal, and also receive data rate information of a Physical Layer Convergence Protocol (PLCP) header and provide the received data rate information to the SFOT unit 180 and the CFOT unit 181.

A method of compensating for a frequency offset of a received signal in a multiband OFDM scheme according to an exemplary embodiment of the present invention, constructed as described above, will be described with reference to FIG. 2.

Figure 2:
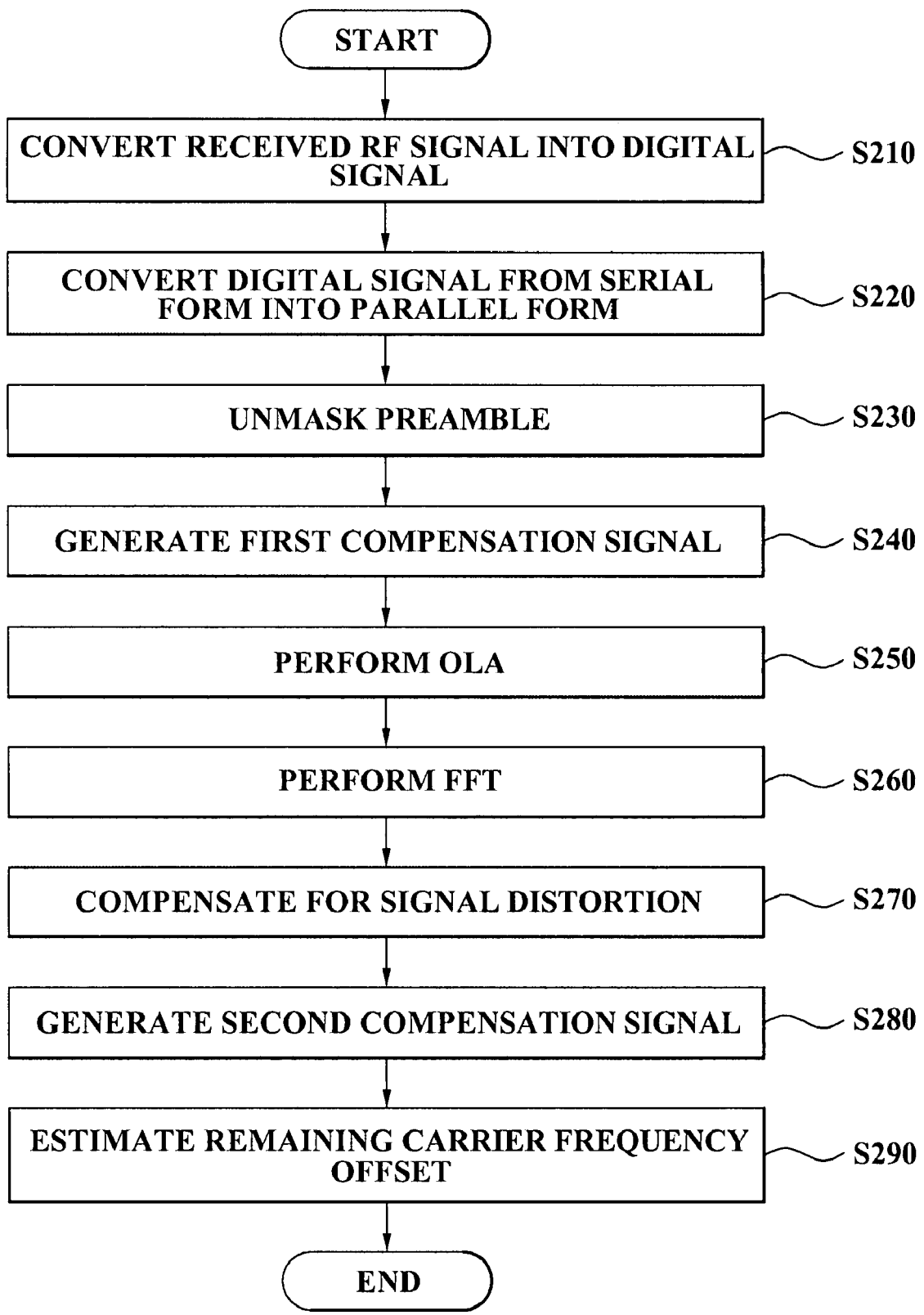
FIG. 2 is a flowchart illustrating a method for compensating for a frequency offset of a received signal in a multiband OFDM scheme according to an exemplary embodiment of the present invention.

FIG. 2 is a flowchart illustrating a method of compensating for a frequency offset of a received signal in a multiband OFDM scheme according to an exemplary embodiment of the present invention.

As shown in FIG. 2, the method of compensating for a frequency offset of a received signal in a multiband OFDM scheme according to the present exemplary embodiment includes: converting a received RF signal into a digital signal (S210); converting the digital signal from serial form into parallel form (S220); unmasking a preamble (S230); generating a first compensation signal (S240); performing an OLA (S250); performing an FFT (S260); compensating for a signal distortion (S270); generating a second compensation signal (S280); and estimating a remaining carrier frequency offset (S290).

Hereinafter, the method of compensating for a frequency offset of a received signal in a multiband OFDM scheme according to an exemplary embodiment of the present invention will be described in detail.

As described above, the ADC 110 receives an RF signal, samples the received RF signal, and converts the sampled RF signal into a digital signal. In this instance, the ADC 110 samples the received RF signal with a frequency greater than 528 MHz.

The switch 120 converts the digital signal from serial form into parallel form. In this case, since the sampling frequency is very high, i.e. greater than 528 MHz, the switch 120 converts the digital signal from serial form into parallel form to perform a process at a lower speed. An operation principle of the switch 120 will be described with reference to FIGS. 3 through 5.

Figure 3:
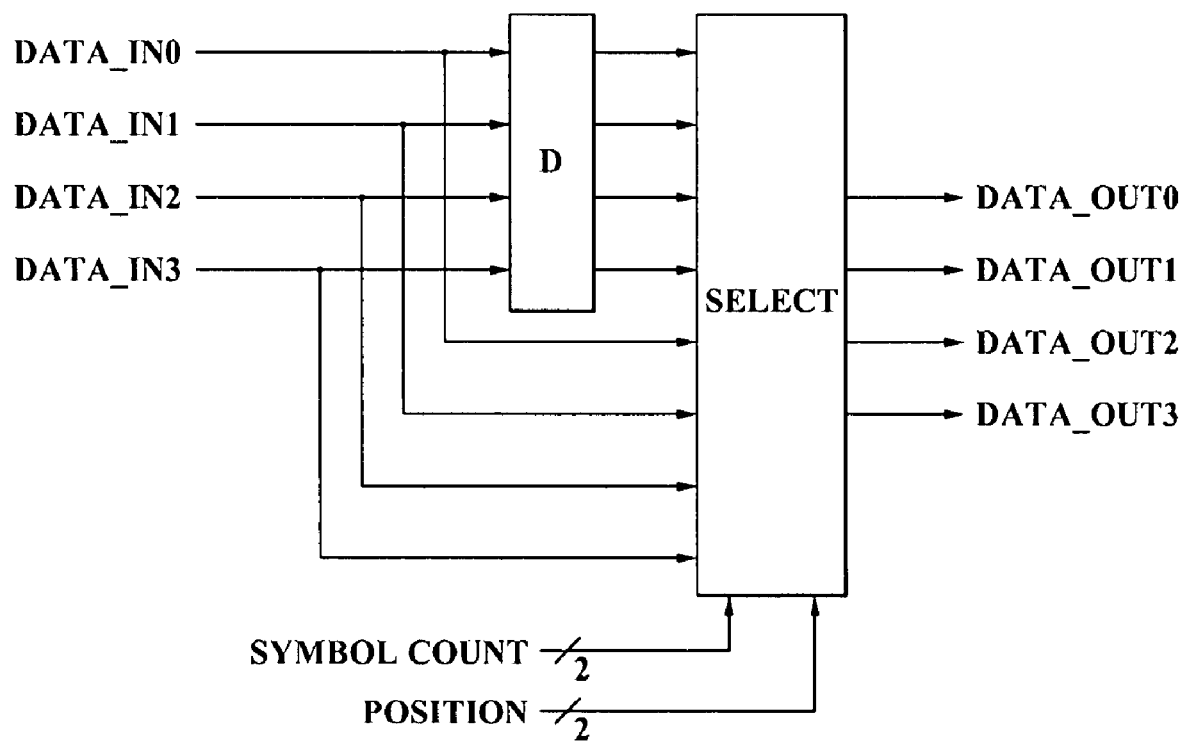
FIG. 3 is a diagram illustrating an example of a structure of a switch of FIG. 1.
Figure 4:
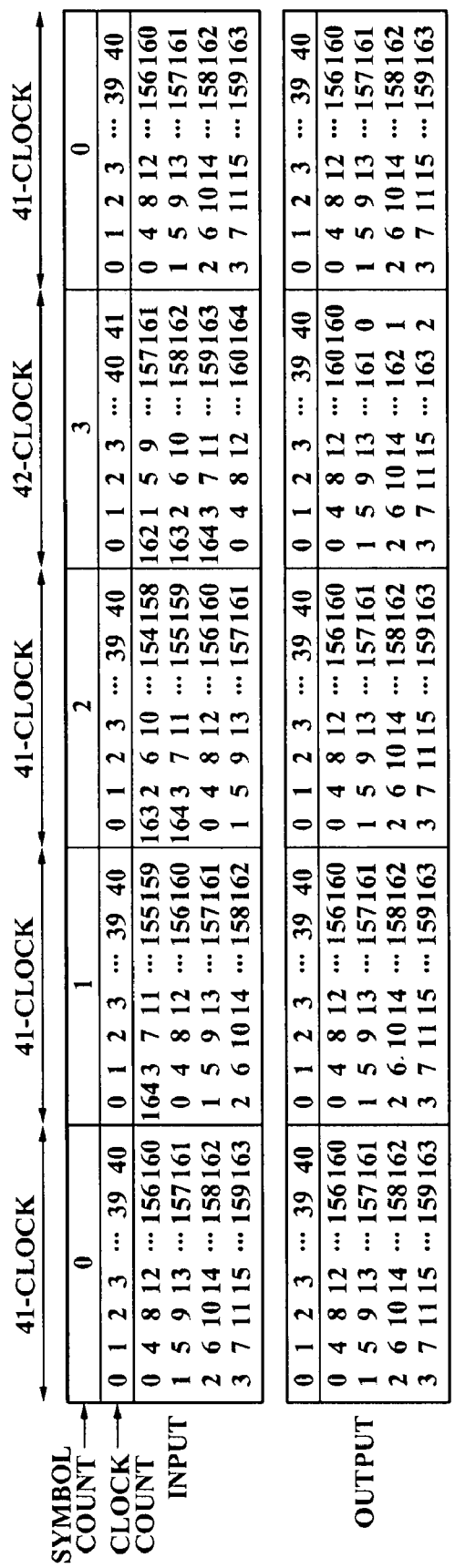
FIG. 4 is a diagram illustrating an example of a basic operation principle of a switch of FIG. 1, according to an exemplary embodiment of the present invention.

FIG. 3 is a diagram illustrating an example of a structure of the switch 120 of FIG. 1, and FIG. 4 is a diagram illustrating an example of a basic operation principle of the switch 120 of FIG. 1, according to an exemplary embodiment of the present invention.

As shown in FIGS. 3 and 4, the switch 120 of FIG. 1 is a switch which performs a one-to-four serial-parallel process, and processes four OFDM symbols in a single period. Specifically, in a multiband OFDM system, since a single OFDM symbol consists of 165 samples, the switch 120 operates once per a four OFDM symbol period by extracting one sample from each of three initial OFDM symbols and adding the three samples to a tail of a last single OFDM symbol.

For the operation, the switch 120 processes the three initial OFDM symbols using a 41-clock period, and process the last single OFDM symbol using a 42-clock period.

The PD unit 121 estimates an existence of a packet and also estimate a starting position of each OFDM symbol. The switch 120 receives a position value from the PD unit 121 to classify OFDM symbols. Here, the position value indicates a starting position of each OFDM symbol. An input/output value of the switch 120 operating according to the position value will be described with reference to FIG. 5.

FIG. 5 is a diagram illustrating an example of an input/output value of a switch using a position value according to an exemplary embodiment of the present invention.

As shown in FIG. 5, the switch according to the present exemplary embodiment has position values of [0, 3] for a four-bit parallel process. Thus, the switch uses any one of 0, 1, 2, and 3 for a starting position of each of four OFDM symbols. As an example, a position value of 0 indicates that a first branch consisting of 0, 4, 8, 12, . . . , 160 samples corresponds to a starting position of the OFDM symbol. Also, a position value of 1 indicates that a second branch consisting of 1, 5, 9, 13, ..., 161 samples corresponds to the starting position of the OFDM symbol, and a position value of 2 indicates that a third branch consisting of 2, 6, 10, 14, ..., 162 samples corresponds to the starting position of the OFDM symbol. Also, a position value of 3 indicates that a fourth branch consisting of 3, 7, 11, 15, ..., 163 samples correspond to the starting position of the OFDM symbol.

The cover sequence unit 130 unmasks a preamble from the digital signal converted into the parallel form according to the TFC. Specifically, the control unit 131 receives timing information about each OFDM symbol from the PD unit 121 and generate a reference cover sequence. The cover sequence unit 130 receives the reference cover sequence from the control unit 131 and unmask the preamble according to the TFC.

Here, the AGC unit 133 reduces a quantization error which may be caused by the ADC 110. The FBD unit 134 informs the control unit 131 where to start a frequency domain signal process by using a sign of an autocorrelation value between a frame sequence and a packet sequence from a signal output from the cover sequence unit 130. In this instance, the preamble includes the packet sequence, the frame sequence and a channel estimation sequence, and has a different structure according to the TFC. Hereinafter, an operation principle of detecting a synchronization from the preamble section according to a time will be described with reference to FIGS. 6 and 7.

Figure 6:
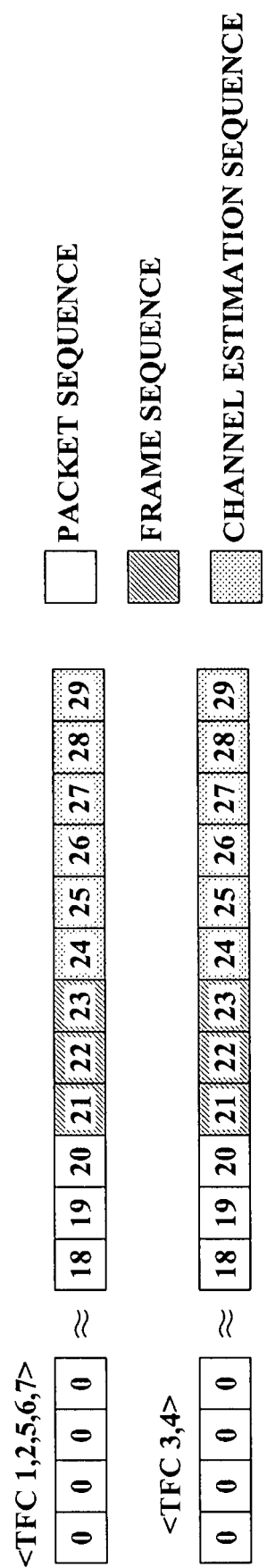
FIG. 6 is a diagram illustrating an example of a structure of a preamble according to an exemplary embodiment of the present invention.
Figure 7:
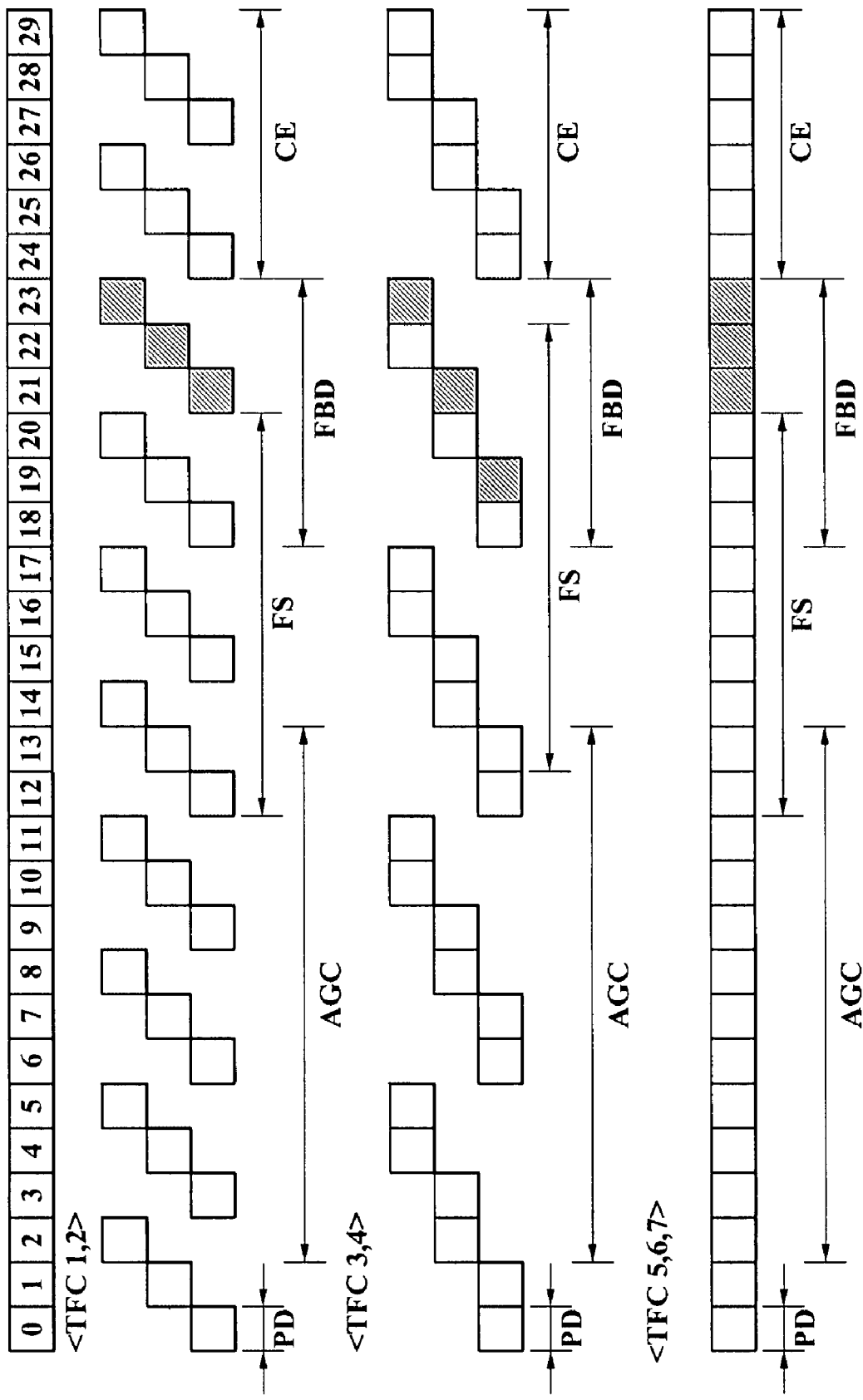
FIG. 7 is a diagram illustrating an example of an operation principle of detecting a synchronization within a preamble section according to an exemplary embodiment of the present invention.

FIG. 6 is a diagram illustrating an example of a structure of a preamble according to an exemplary embodiment of the present invention, and FIG. 7 is a diagram illustrating an example of an operation principle of detecting a synchronization from a preamble section according to an exemplary embodiment of the present invention.

As shown in FIGS. 6 and 7, the preamble according to an exemplary embodiment of the present invention has a different structure according to a TFC. Here, the preamble includes a packet sequence consisting of 21 OFDM symbols, a frame sequence consisting of 3 OFDM symbols, and a channel estimation sequence consisting of 6 OFDM symbols. Thus, the PD unit 121, the AGC unit 133, the FS unit 132, the FBD unit 134, and the CE unit 171 estimates a starting position of a signal process based on the preamble. The NCO 140 generates a first compensation signal by processing an input signal from the cover sequence unit 130 in the time domain based on a first carrier frequency offset estimated in the time domain and a second carrier frequency offset estimated in the frequency domain. Specifically, the NCO 140 compensates for the input signal in the time domain using a phase value which corresponds to the estimated first carrier frequency offset and the second carrier frequency offset.

A carrier frequency offset estimated in the time domain from the received signal indicates the first carrier frequency offset. A remaining carrier frequency offset estimated in the frequency domain after the first carrier frequency offset is compensated for indicates the second carrier frequency offset.

Also, the FS unit 132 estimates the first carrier frequency offset from the input signal from the cover sequence unit 130. In this instance, in a multiband OFDM system, since a frequency hopping is performed within three frequency bands, a carrier frequency offset with respect to each of the three frequency bands is estimated. Specifically, the carrier frequency offset with respect to each of the three frequency bands is estimated as follows.

The FS unit 132 acquires a phase difference in a 128 sample section where a real signal exists between OFDM symbols. Here, the OFDM symbols are spaced apart from each other by a predetermined distance FS_DELAY. Also, when a frequency between a transmitter and a receiver is a dual frequency (DF), the phase difference between the OFDM symbols, which are spaced apart from each other by the distance FS_DELAY, is acquired by Equation 1 as follows.

$$\Delta\theta = 2\pi B \Delta F (FS\_DELAY*165) T_S \qquad \text{[Equation 1]}$$

Here, $T_S$ indicates a sampling interval, which is 1/528 MHz in the present non-limiting example, and B indicates a constant according to a frequency band. In this instance, when the frequency band is 0, B indicates 3432/3960. When the frequency band is 1, B indicates 1, and when the frequency band is 2, B indicates 4488/3960.

For each of frequency bands, the phase difference with respect to an OFDM symbol, which is spaced part from an $m^{th}$ OFDM symbol by FS_DELAY, is acquired by Equation 2 as follows.

$$\Delta\hat{\theta}_b = \frac{1}{(165*FS\_DELAY)T_S * B} \tan^{-1}\left(\frac{\text{Im}\{corr\_out\}}{\text{Re}\{corr\_out\}}\right), \qquad \text{[Equation 2]}$$
$$b = \{0, 1, 2\}$$

Here, corr_out indicates an autocorrelation output, that is $$\sum_{m=0}^{M-1} \sum_{n=0}^{127} a_m FS\_DELAY,$$

$$na^*_{(m+1)}FS\_DELAY, n,$$

and M indicates a number of autocorrelations.

An average phase difference and a phase difference for each of frequency bands by a carrier frequency offset based on the average phase difference is acquired by Equation 3 as follows.

$$\Delta\hat{\theta}_{avg} = \Delta\hat{\theta}_0 + \Delta\hat{\theta}_1 + \Delta\hat{\theta}_2, \Delta\hat{\theta}_b = B \cdot \Delta\hat{\theta}_{avg}, \quad b=0,1,2 \qquad \text{[Equation 3]}$$

Also, the OLA unit 150 verlaps and adds a predetermined sample to a header of each OFDM symbol. Here, the predetermined sample is acquired when the first compensation signal output from the NCO 140 is delayed and spread. A principle related thereto will be described with reference to FIG. 8.

Figure 8:
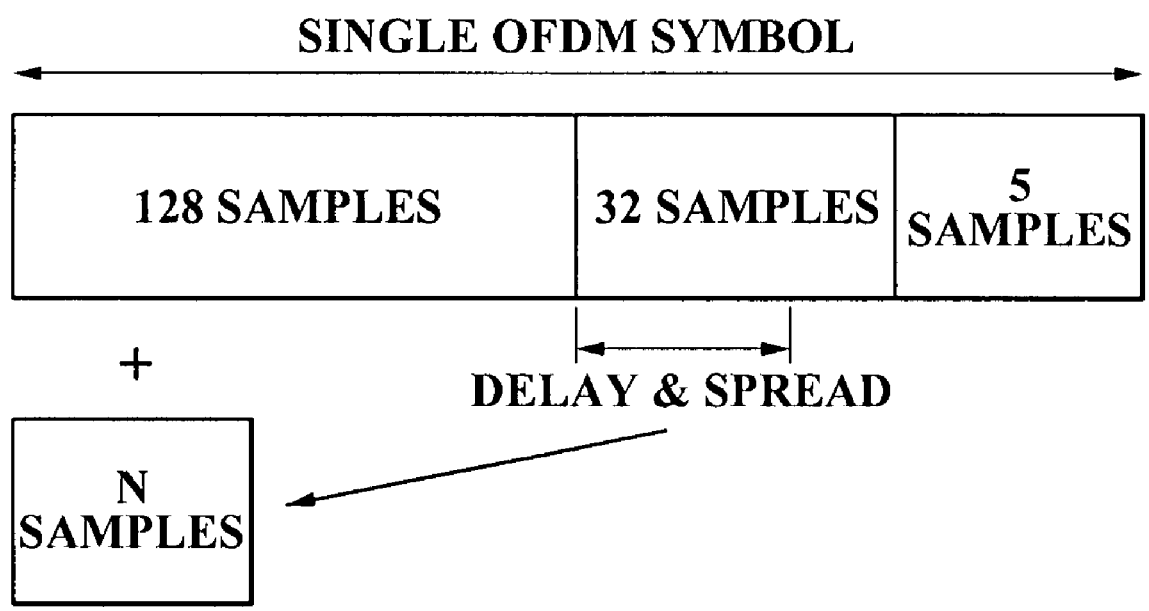
FIG. 8 is a diagram illustrating an example of an overlap and add (OLA) operation principle according to an exemplary embodiment of the present invention.

FIG. 8 is a diagram illustrating an example of an OLA operation principle according to an exemplary embodiment of the present invention.

As shown in FIG. 8, according to an exemplary embodiment of the present invention, a single OFDM symbol includes 165 samples. The single OFDM symbol consists of 128 valid samples, 32 samples of a zero-prefix, and 5 samples of a guard interval. In the case of a multi-pass channel, delay and spread with respect to the 128 valid samples occur in a 32-sample section of the zero-prefix. Thus, a predetermined sample of the delayed and spread zero-prefix is cut, and overlapped and added to the 128 valid samples.

The FFT unit 160 fast Fourier transforms signals output from the OLA unit 150 into the frequency domain. The CE unit 171 estimates a signal distortion from the signals output from the FFT unit 160. Also, the EQ unit 170 compensates for the signals output from the FFT unit 160 based on the estimated signal distortion.

The CE unit 171 estimates an amplitude and phase distortion which is caused by the multi-pass channel in a channel estimation sequence section. In this instance, the CE unit 171 estimates a channel with respect to each of 128 subcarriers. When an FFT output corresponding to a channel estimation sequence of a $b^{th}$ frequency band is $Y_{b,k}$, the channel estimation is acquired by $$\hat{H}_{b,k} = \frac{1}{B}\sum_{n=0}^{B} Y_{b,k} X_k^*$$ [Equation 4]

Here, B indicates a number of OFDM symbols corresponding to a channel estimation sequence for each frequency band, and has a different value according to a TFC. Specifically, B indicates 2 with respect to TFC 1 through 4 and also indicates 5 with respect to TFC 5 through 7.

A channel response of a $k^{th}$ subcarrier is acquired by taking an average with an adjacent subcarrier, as given by $$\tilde{H}_{b,k} = \frac{0.5\hat{H}_{b,k-1} + \hat{H}_{b,k} + 0.5\hat{H}_{b,k+1}}{2},$$ [Equation 5]

$b = 0, 1, 2$

The SFTO unit 180 generates a second compensation signal by estimating a sampling frequency offset from frequency domain pilot symbols which are contained in the signal output from the EQ unit 170. Also, the switch 120 adjusts a timing of the OFDM symbol based on the sampling frequency offset estimated in the time domain.

The CFOT unit 181 generates the second carrier frequency offset by using pilot symbols which are contained in the second compensation signal. An estimated frequency offset will be described with reference to FIG. 9.

Figure 9:
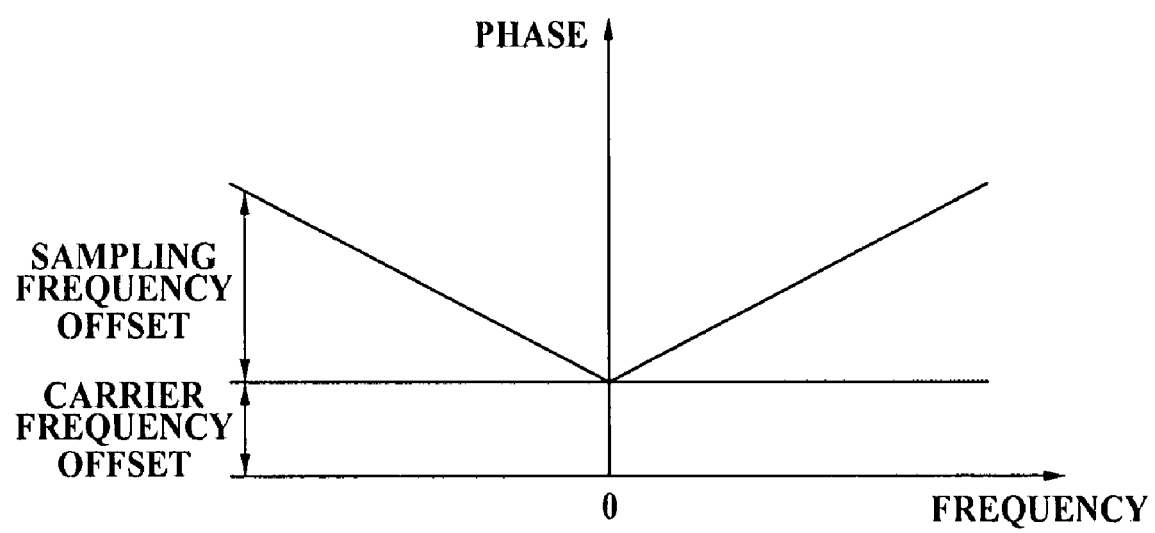
FIG. 9 is a diagram illustrating an example of a frequency offset estimated in a frequency domain according to an exemplary embodiment of the present invention.

FIG. 9 is a diagram illustrating an example of a frequency offset estimated in a frequency domain according to an exemplary embodiment of the present invention.

As shown in FIG. 9, according to an exemplary embodiment of the present invention, the carrier frequency offset indicates an identical phase error in the frequency domain, and the sampling frequency offset is shown as a phase error which linearly increases according to a frequency. When a linear phase error exists, a phase error is not estimated by a common method. Thus, it is possible to initially estimate a phase error, which is caused by a sampling frequency offset, and compensate for the estimated phase error, and then estimate a phase error, which is caused by a remaining carrier frequency offset.

Since a pilot symbol changes according to a data rate, the demodulation and decision unit 190 demodulates the second compensation signal and also receives data rate information of a PLCP header, and provide the received data rate information to the SFOT unit 180 and the CFOT 181.

The exemplary embodiments of the present invention include computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the preset invention, there is provided a receiver and method for compensating for a frequency offset of a received signal in a multiband OFDM scheme, which can effectively compensate for a frequency offset of a received signal by a multiband OFDM receiver by compensating for a carrier frequency offset in a time domain and compensating for a sampling frequency offset in a frequency domain and then estimating a remaining carrier frequency offset.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A receiver for compensating for a frequency offset of a received signal in a multiband Orthogonal Frequency Division Multiplexing (OFDM) scheme, the receiver comprising:
    a numerically controlled oscillator (NCO) which generates a first compensation signal by processing an input signal in a time domain based on a first carrier frequency offset estimated in the time domain, and a second carrier frequency offset estimated in a frequency domain;
    a sampling frequency offset tracking (SFOT) unit which generates a second compensation signal by estimating a sampling frequency offset from frequency domain pilot symbols which are contained in the first compensation signal;
    a carrier frequency offset tracking (CFOT) unit which estimates the second carrier frequency offset by using pilot symbols which are contained in the second compensation signal;
    an analog-to-digital converter (ADC) which samples a received radio frequency (RF) signal, and converts the sampled RF signal into a digital signal;
    a switch which converts the digital signal from serial form into parallel form according to a position value;
    a packet detection unit which provides the position value; and
    a cover sequence unit which generates the input signal by unmasking a preamble from the digital signal converted into the parallel form according to a Time Frequency Code (TFC).

2. The receiver of claim 1, wherein the second carrier frequency offset corresponds to a remaining carrier frequency offset estimated in the frequency domain after the first carrier frequency offset estimated in the time domain is compensated for.

3. The receiver of claim 1, wherein the position value corresponds to a value which indicates a starting position of an OFDM symbol in the sampled RF signal, and corresponds to one of 0, 1, 2, and 3.

4. The receiver of claim 1, wherein the switch processes four OFDM symbols, which consist of three OFDM symbols, each of the three OFDM symbol comprising 164 samples, and a single OFDM symbol comprising 168 samples, within a single period with respect to an OFDM symbol comprising 165 samples.

5. The receiver of claim 4, wherein the switch inserts one sample extracted from each of the three OFDM symbols, into a tail of the single OFDM symbol according to the position value.

6. The receiver of claim 1, wherein the switch adjusts an OFDM symbol timing based on a phase error corresponding to the sampling frequency offset estimated by the SFOT unit.

7. The receiver of claim 1, further comprising:
an overlap and add (OLA) unit which overlaps and adds a predetermined sample to a header of each OFDM symbol of the received signal, the predetermined sample being acquired when the first compensation signal output from the NCO is delayed and spread;
a fast Fourier transform (FFT) unit which fast Fourier transforms signals output from the OLA unit into the frequency domain;
a channel estimation unit which estimates a signal distortion from signals output from the FFT unit; and
an equalization unit which compensates for each signal output from the FFT unit based on the estimated signal distortion, and outputs the compensated signal to the SFOT unit.

8. The receiver of claim 7, wherein the predetermined sample is within a range of 32 samples of a zero-prefix where the delaying and spreading occurs, and is added to 128 valid samples of each OFDM symbol of the received signal.

9. The receiver of claim 1, further comprising a frequency synchronization unit which estimates the first carrier frequency offset from the input signal.

10. The receiver of claim 1, further comprising a demodulation and decision unit which demodulates the second compensation signal, and provides data rate information of a Physical Layer Convergence Protocol (PLCP) header to determine the pilot symbols to be used by the CFOT unit.

11. A method of compensating for a frequency offset of a received signal in a multiband Orthogonal Frequency Division Multiplexing (OFDM) scheme, the method comprising:
generating a first compensation signal by processing an input signal in a time domain;
generating a second compensation signal by estimating a sampling frequency offset from frequency domain pilot symbols which are contained in the first compensation signal;
estimating a second carrier frequency offset by using pilot signals which are contained in the second compensation signal;
sampling a received radio frequency (RF) signal to convert the sampled RF signal into a digital signal;
converting the digital signal from serial form into parallel form according to a position value;
providing the position value; and
generating the input signal by unmasking a preamble from the digital signal converted into the parallel form according to a Time Frequency Code (TFC),
wherein the generating of the first compensation signal comprises:
processing the input signal based on a first carrier frequency offset estimated in the time domain and the second carrier frequency offset estimated in a frequency domain.

12. The method of claim 11, wherein the second carrier frequency offset corresponds to a remaining carrier frequency offset estimated in the frequency domain after the first carrier frequency offset estimated in the time domain is compensated for.

13. The method of claim 11, wherein the position value corresponds to a value which indicates a starting position of an OFDM symbol in the sampled RF signal, and corresponds to one of 0, 1, 2, and 3.

14. The method of claim 11, wherein the switching comprises processing four OFDM symbols, which consist of three OFDM symbols, each of the three OFDM symbol comprising 164 samples, and a single OFDM symbol comprising 168 samples, within a single period with respect to an OFDM symbol comprising 165 samples.

15. The method of claim 14, wherein the switching comprises inserting one sample extracted from each of the three OFDM symbols, into a tail of the single OFDM symbol according to the position value.

16. The method of claim 11, wherein the switching comprises adjusting an OFDM symbol timing based on a phase error corresponding to the estimated sampling frequency offset.

17. The method of claim 11, wherein prior to the generating of the second compensation signal, the method further comprises:
overlapping and adding a predetermined sample to a header of each OFDM symbol of the received signal, the predetermined sample being acquired when the first compensation signal is delayed and spread;
fast Fourier transforming a signal output from the overlapping and adding into the frequency domain;
estimating a signal distortion from the fast Fourier transformed signal; and
compensating for the fast Fourier transformed signal based on the estimated signal distortion.

18. The method of claim 17, wherein the predetermined sample is within a range of 32 samples of a zero-prefix where the delaying and spreading occurs, and is added to 128 valid samples of each OFDM symbol of the received signal.

19. The method of claim 11, further comprising estimating the first carrier frequency offset from the input signal.

20. The method of claim 11, further comprising demodulating the second compensation signal, and providing data rate information of a Physical Layer Convergence Protocol (PLCP) header to determine the pilot symbols to be used.

21. A non-transitory computer-readable recording medium storing a program for implementing a method of compensating for a frequency offset of a received signal in a multiband Orthogonal Frequency Division Multiplexing (OFDM) scheme, the method comprising:
generating a first compensation signal by processing an input signal in a time domain;
generating a second compensation signal by estimating a sampling frequency offset from frequency domain pilot symbols which are contained in the first compensation signal; and
estimating a second carrier frequency offset by using pilot signals which are contained in the second compensation signal;
sampling a received radio frequency (RF) signal to convert the sampled RF signal into a digital signal;
converting the digital signal from serial form into parallel form according to a position value;
providing the position value; and
generating the input signal by unmasking a preamble from the digital signal converted into the parallel form according to a Time Frequency Code (TFC),
wherein the generating of the first compensation signal comprises:
processing the input signal based on a first carrier frequency offset estimated in the time domain and the second carrier frequency offset estimated in a frequency domain.

* * * * *